United States Patent
Lee et al.

(10) Patent No.: US 11,305,630 B2
(45) Date of Patent: Apr. 19, 2022

(54) TRANSMISSION FOR ELECTRIC VEHICLE AND CONTROL METHOD THEREOF

(71) Applicants: Hyundai Motor Company, Seoul (KR); Kia Motors Corporation, Seoul (KR)

(72) Inventors: Jae Joon Lee, Anyang-si (KR); Jin Young Hwang, Yongin-si (KR); Jin Ho Kim, Suwon-si (KR); Jong Sung Kim, Incheon (KR); Sung Whan Min, Seoul (KR); Jong Sool Park, Hwaseong-si (KR); Wook Jin Jang, Yongin-si (KR); Jin Hyung Kong, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 214 days.

(21) Appl. No.: 16/777,565

(22) Filed: Jan. 30, 2020

(65) Prior Publication Data
US 2021/0094403 A1 Apr. 1, 2021

(30) Foreign Application Priority Data
Sep. 27, 2019 (KR) ...................... 10-2019-01195298

(51) Int. Cl.
*F16H 45/02* (2006.01)
*B60K 6/365* (2007.10)
(Continued)

(52) U.S. Cl.
CPC .............. *B60K 6/365* (2013.01); *B60K 6/445* (2013.01); *B60W 10/08* (2013.01); *F16H 3/62* (2013.01);
(Continued)

(58) Field of Classification Search
CPC .......... B60K 6/365; B60K 6/445; B60K 1/00; B60K 1/02; B60K 3/666; B60K 3/64;
(Continued)

(56) References Cited

U.S. PATENT DOCUMENTS 8,651,991 B1 * 2/2014 Sten .................. F16H 48/30
475/150
2007/0265127 A1 * 11/2007 Raghavan ............... F16H 3/728
475/5

(Continued)

FOREIGN PATENT DOCUMENTS

KR 10-2013-0117184 A 10/2013

*Primary Examiner* — Charles A Fox
*Assistant Examiner* — Farhana Pervin
(74) *Attorney, Agent, or Firm* — Morgan, Lewis & Bockius LLP (57) ABSTRACT

A transmission for an electric vehicle may include a first planetary gear set; a first motor configured to input power to a first rotation element of the first planetary gear set; a differential configured to receive power output from a second rotation element of the first planetary gear set; a second motor configured to selectively provide power to a third rotation element of the first planetary gear set; a second planetary gear set including a first rotation element which is directly connected to the differential, and a second rotation element which is configured to selectively receive power from the second motor; and a third planetary gear set including a third rotation element which is directly connected to a third rotation element of the second planetary gear set, a second rotation element which is fixed, and a first rotation element which is directly connected to a selected output shaft of the differential.

15 Claims, 10 Drawing Sheets

(51) Int. Cl.
  *B60K 6/445*  (2007.10)
  *B60W 10/08*  (2006.01)
  *F16H 3/62*  (2006.01)
  *F16H 3/72*  (2006.01)

(52) U.S. Cl.
  CPC ........ *F16H 3/727* (2013.01); *F16H 2200/201* (2013.01); *F16H 2200/2041* (2013.01)

(58) Field of Classification Search
  CPC .... B60W 10/08; B60W 10/115; B60W 30/19; B60W 2710/08; B60W 2710/083; B60W 2710/1005; F16H 3/727; F16H 2200/201; F16H 2200/2041
  See application file for complete search history.

(56) References Cited

U.S. PATENT DOCUMENTS

| | | | |
|---|---|---|---|
| 2007/0265128 A1* | 11/2007 | Conlon | B60K 6/547 475/5 |
| 2009/0029825 A1* | 1/2009 | Matsubara | B60K 6/365 477/35 |
| 2009/0156359 A1* | 6/2009 | Tabata | F16H 61/0437 477/108 |
| 2009/0275437 A1* | 11/2009 | Kersting | B60K 6/26 475/5 |
| 2014/0148292 A1* | 5/2014 | Lee | B60K 6/365 475/5 |
| 2017/0159775 A1* | 6/2017 | Kook | F16H 3/66 |

\* cited by examiner

|  | CL3 | CL4 | CL1 | CL2 | DESCRIPTION |
|---|---|---|---|---|---|
| SHIFTING MODE | ● |  | ● |  | FIRST SPEED: SHIFTABLE TO SECOND SPEED |
|  | ● |  |  | ● | SECOND SPEED: SHIFTABLE TO FIRST SPEED |
| TORQUE VECTORING MODE |  | ● | ● |  | FIRST SPEED: TORQUE VECTORING IS POSSIBLE |
|  |  | ● |  | ● | SECOND SPEED: TORQUE VECTORING IS POSSIBLE |

|  | MG1 | MG2 | CL1 | CL2 |
|---|---|---|---|---|
| FIRST SPEED | T_MG1a |  | T_CL1 |  |
| ①: FIRST TORQUE PHASE | T_MG1a | T_CL1 |  |  |
| ②: INERTIA PHASE | T_MG1a | T_CL1 |  |  |
| ③: SECOND TORQUE PHASE | T_MG1b |  |  | T_CL2 |
| SECOND SPEED | T_MG1b |  |  | T_CL2 |

|  | MG1 | MG2 | CL1 | CL2 |
|---|---|---|---|---|
| SECOND SPEED | T_MG1b |  |  | T_CL2 |
| ①: FIRST TORQUE PHASE | T_MG1a | T_CL1 |  |  |
| ②: INERTIA PHASE | T_MG1a | T_CL1 |  |  |
| ③: SECOND TORQUE PHASE | T_MG1a |  | T_CL1 |  |
| FIRST SPEED | T_MG1a |  | T_CL1 |  |

FIG. 10

| | S2 | C2 | R2 | S3 | C3 | R3 | OL | OR | MG1 | MG2 |
|---|---|---|---|---|---|---|---|---|---|---|
| ROTATION SPEED(rpm) | 3000 | 0 | -1500 | 3000 | 0 | -1500 | 3000 | 3000 | 3000 | 0 |

FIG. 11

| | S2 | C2 | R2 | S3 | C3 | R3 | OL | OR | MG1 | MG2 |
|---|---|---|---|---|---|---|---|---|---|---|
| ROTATION SPEED(rpm) | 3000 | 100 | −1350 | 2700 | 0 | −1350 | 3300 | 2700 | 3000 | 100 |

TRANSMISSION FOR ELECTRIC VEHICLE AND CONTROL METHOD THEREOF

CROSS REFERENCE TO RELATED APPLICATION

The present application claims priority to Korean Patent Application No. 10-2019-0119298, filed Sep. 27, 2019, the entire contents of which is incorporated herein for all purposes by this reference.

BACKGROUND OF THE INVENTION

Field of the Invention

The present invention relates to a transmission which may be mounted in an electric vehicle, and a control method thereof.

Description of Related Art

An electric vehicle, which is a vehicle in which power of an electric motor is provided as a driving force, emits no exhaust gas and thus may contribute to a reduction of environmental pollution in a major city.

A variety of technologies need to be improved to achieve popularization of the electric vehicle, and particularly, a technology capable of dramatically increasing a driving distance per charge has been required.

To increase the driving distance, a maximum hill-climbing ability and maximum speed performance required by the vehicle need to be achieved while improving energy efficiency (driving distance per unit power, km/kWh) by reducing a size and a capacity of the motor mounted in the electric vehicle. In this regard, a transmission is mounted in the electric vehicle.

It is required that the transmission mounted in the electric vehicle for such a reason has a simple configuration, no shift shock occurs, and heat generation is small.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission for an electric vehicle configured for providing a plurality of gear ratios to reduce a capacity of a motor, achieving a maximum hill-climbing ability and maximum speed performance required by the vehicle, improving energy efficiency of the vehicle with a relatively simple configuration and a small weight, preventing shift shock, significantly reducing heat generation, and implementing a torque vectoring function to improve high-speed curve driving performance of the vehicle, and a control method thereof.

According to an exemplary embodiment of the present invention, a transmission for an electric vehicle includes: a first planetary gear set; a first motor configured to input power to a first rotation element of the first planetary gear set; a differential configured to receive power output from a second rotation element of the first planetary gear set; a second motor configured to selectively provide power to a third rotation element of the first planetary gear set; a second planetary gear set including a first rotation element which is connected to a differential case of the differential, and a second rotation element which is configured to selectively receive power from the second motor; and a third planetary gear set including a third rotation element which is connected to a third rotation element of the second planetary gear set, a second rotation element which is fixed, and a first rotation element which is connected to a selected output shaft, the selected output shaft being any one of output shafts of the differential.

A first clutch configured to selectively connect the third rotation element of the first planetary gear set to a transmission housing, and a second clutch configured to directly connect two of the three rotation elements of the first planetary gear set to each other may be connected to the first planetary gear set.

The first planetary gear set may be constituted by a first sun gear as an input element directly connected to the first motor, a first planet carrier as an output element directly connected to the differential case, and a first ring gear connected to the first clutch, and the second clutch may couple the first sun gear and the first ring gear to each other.

The second motor may be connected to the first ring gear of the first planetary gear set through a third clutch.

The second rotation element of the second planetary gear set may be connected to the second motor through a fourth clutch.

A ratio of the number of teeth of a second sun gear of the second planetary gear set and the number of teeth of a second ring gear of the second planetary gear set, and a ratio of the number of teeth of a third sun gear of the third planetary gear set and the number of teeth of a third ring gear of the third planetary gear set may be the same as each other.

According to various exemplary embodiments of the present invention, a transmission for an electric vehicle includes: a first planetary gear set; a first motor configured to input power to a first rotation element of the first planetary gear set; a differential configured to receive power output from a second rotation element of the first planetary gear set; a second motor configured to selectively provide power to a third rotation element of the first planetary gear set; and a compound planetary gear set mounted between a differential case of the differential and a selected output shaft to distribute power provided from the second motor to the differential case and the selected output shaft, and make directions of torques distributed to the differential case and the selected output shaft be opposite to each other, the selected output shaft being any one of output shafts of the differential.

The compound planetary gear set may include: a second planetary gear set including a first rotation element which is connected to the differential case of the differential, and a second rotation element which is configured to be coupled to the second motor; and a third planetary gear set including a third rotation element which is connected to a third rotation element of the second planetary gear set, a second rotation element which is fixed, and a first rotation element which is connected to the selected output shaft.

According to various exemplary embodiments of the present invention, a transmission for an electric vehicle includes two or more motors, two or more clutches, and one or more planetary gear sets, and has two or more gears, wherein a first motor is connected to a first rotation element of a first planetary gear set, a third rotation element of the first planetary gear set is selectively connectable to a transmission housing by a first clutch, a second rotation element of the first planetary gear set is connected to an output shaft, a second motor is connected to the third rotation element of the first planetary gear set, a second clutch connecting any two elements of the first planetary gear set is provided, and transmission control through the second motor is allowed.

The second motor may be continuously connected to the third rotation element of the first planetary gear set through a decelerator.

According to various exemplary embodiments of the present invention, a control method of the transmission for an electric vehicle includes; releasing, by a controller, the first clutch after controlling the second motor to provide, to the third rotation element of the first planetary gear set, the same torque as a torque by which the first clutch supports the third rotation element of the first planetary gear set, in a low gear driving state in which the first clutch is engaged and the first motor is driven; maintaining, by the controller, a torque of the first motor and a torque of the second motor constant while reducing a speed of the first motor and increasing a speed of the second motor to synchronize speeds of the three rotation elements of the first planetary gear set with one another; and releasing, by the controller, the torque of the second motor while maintaining the speed of the first motor after engaging the second clutch to form a high gear driving state.

The controller may engage the third clutch before the torque is provided from the second motor to the third rotation element of the first planetary gear set, and release the third clutch after engaging the second clutch.

After engaging the fourth clutch, the controller may be configured to control the second motor to apply torques in opposite directions to the differential case and the selected output shaft, to perform torque vectoring.

The control method may further include: releasing, by the controller, the second clutch after increasing the torque of the second motor to a first clutch torque while maintaining the speed of the first motor, in the high gear driving state in which the second clutch is engaged and the first motor is driven; maintaining, by the controller, the torque of the first motor and the torque of the second motor constant while reducing the speed of the second motor to 0 and increasing the speed of the first motor; and releasing, by the controller, the torque of the second motor after engaging the first clutch to form the low gear driving state.

The controller may engage the third clutch before releasing the second clutch and increasing the torque of the second motor, and release the third clutch after releasing the torque of the second motor.

After engaging the fourth clutch, the controller may be configured to control the second motor to apply torques in opposite directions to the differential case and the selected output shaft, to perform torque vectoring.

According to various exemplary embodiments of the present invention, a control method of the transmission for an electric vehicle includes: releasing, by a controller, the first clutch after controlling the second motor to provide, to the third rotation element of the first planetary gear set, the same torque as a torque by which the first clutch supports the third rotation element of the first planetary gear set, in a low gear driving state in which the first clutch is engaged and the first motor is driven; maintaining, by the controller, a torque of the first motor and a torque of the second motor constant while reducing a speed of the first motor and increasing a speed of the second motor to synchronize speeds of the three rotation elements of the first planetary gear set with one another; and releasing, by the controller, the torque of the second motor while maintaining the speed of the first motor after engaging the second clutch to form a high gear driving state.

The control method may further include: releasing, by the controller, the second clutch after increasing the torque of the second motor to a first clutch torque while maintaining the speed of the first motor, in the high gear driving state in which the second clutch is engaged and the first motor is driven; maintaining, by the controller, the torque of the first motor and the torque of the second motor constant while reducing the speed of the second motor to 0 and increasing the speed of the first motor; and releasing, by the controller, the torque of the second motor after engaging the first clutch to form the low gear driving state.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a folding personal mobility vehicle according to exemplary embodiments of the present invention is described with reference to the accompanying drawings.

Figure 1:
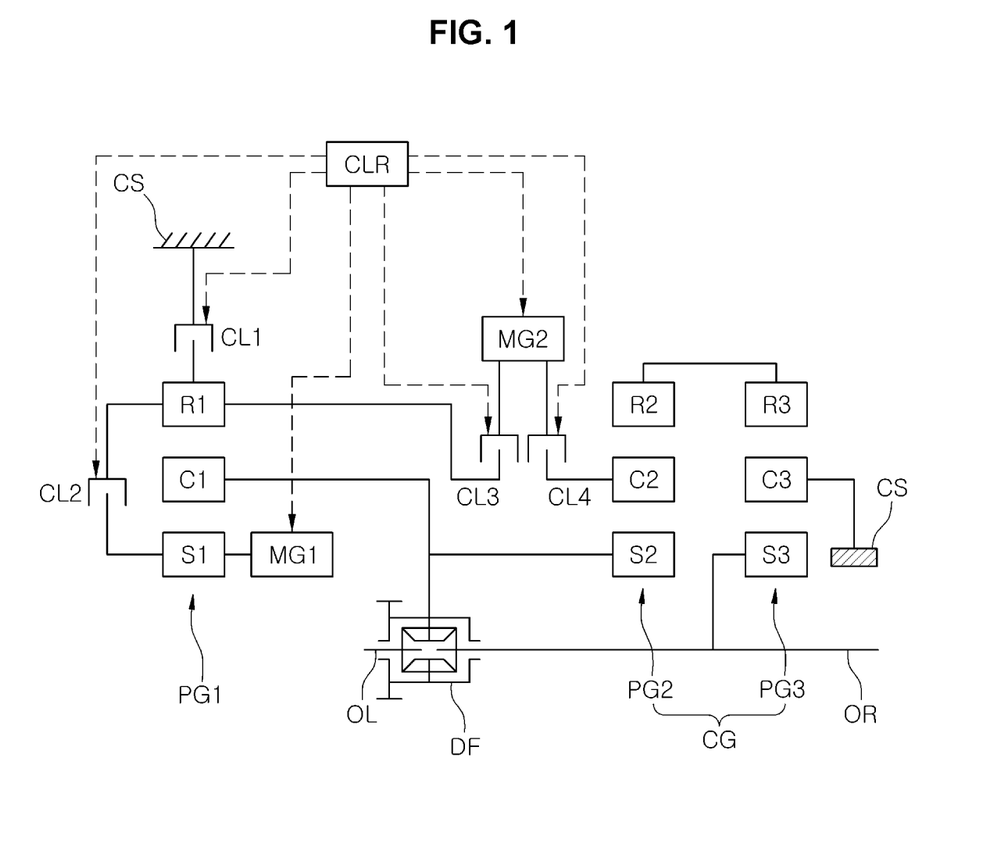
FIG. 1 is a schematic diagram of a transmission for an electric vehicle according to an exemplary embodiment of the present invention.
Figure 2:
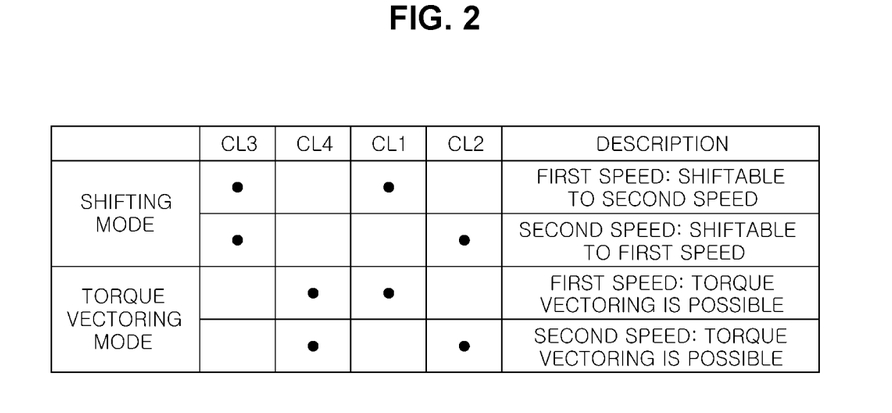
FIG. 2 is a table for describing operation modes of the transmission of FIG. 1.
Figure 3:
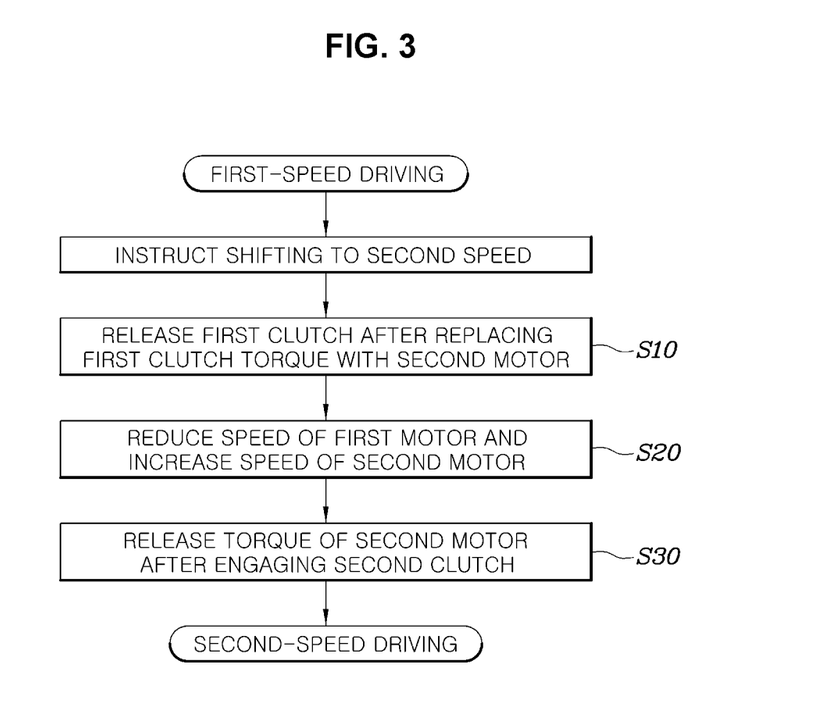
FIG. 3 is a flowchart illustrating a control method by which the transmission of FIG. 1 is shifted from low to high gear.

Referring to FIG. 1, a transmission for an electric vehicle according to an exemplary embodiment of the present invention includes: a first planetary gear set PG1; a first motor MG1 inputting power to a first rotation element of the first planetary gear set PG1; a differential DF receiving power output from a second rotation element of the first planetary gear set PG1; a second motor MG2 providing power to a third rotation element of the first planetary gear set PG1; and a compound planetary gear set CG mounted between a differential case of the differential DF and a selected output shaft which is any one of output shafts of the differential DF to distribute power provided from the second motor MG2 to the differential case and the selected output shaft, and make directions of torques distributed to the differential case and the selected output shaft be opposite to each other.

That is, according to an exemplary embodiment of the present invention, an output speed of the power input from the first motor MG1 is changed by the first planetary gear set PG1 and then the power may be output through the differential DF, the second motor MG2 applies an appropriate torque to the third rotation element of the first planetary gear set PG1 to enable smooth shifting without shift shock, and the power provided from the second motor MG2 is distributed through the compound planetary gear set CG to implement a torque vectoring function.

Note that a right output shaft OR and a left output shaft OL are separately provided as the output shafts of the differential DF, and among these, an output shaft selected to receive the power provided from the second motor MG2 is referred to as the "selected output shaft". Although the case where the right output shaft OR is the selected output shaft is illustrated in FIG. 1. According to the exemplary embodiment of the present invention, it is a matter of course that the left output shaft OL may also become the selected output shaft.

A first clutch CL1 which may fix the third rotation element to a transmission housing, and a second clutch CL2 which may directly connect two of the three rotation elements to each other are connected to the first planetary gear set PG1.

That is, the first planetary gear set PG1 includes a first sun gear S1 as an input element directly connected to the first motor MG1, a first planet carrier C1 as an output element directly connected to the differential DF, and a first ring gear R1 connected to the first clutch CL1, and the second clutch CL2 may couple the first sun gear S1 and the first ring gear R1 to each other.

In the first planetary gear set PG1, once the first sun gear S1 is driven by the first motor MG1 in a state in which the first clutch CL1 is engaged to fix the first ring gear R1, switching between a state in which an output speed of the power is reduced by the first planet carrier C1 and the power is output through the differential DF, and a state in which the first clutch CL1 is released and the second clutch CL2 is engaged to allow all the rotation elements of the first planetary gear set PG1 to rotate together, such that the power transferred from the first motor MG1 is output through the differential DF as it is, may be performed, and thus the input power may be output at a speed equal to or lower than a constant speed.

Meanwhile, the second motor MG2 may be connected to the first ring gear R1 of the first planetary gear set PG1 through the third clutch CL3 to selectively transfer the power to the first ring gear R1.

The compound planetary gear set CG includes a second planetary gear set PG2 including a first rotation element directly connected to the differential case of the differential DF and a second rotation element receiving the power from the second motor MG2; and a third planetary gear set PG3 including a third rotation element directly connected to a third rotation element of the second planetary gear set PG2, a second rotation element fixed to the transmission housing CS, and a first rotation element directly connected to the selected output shaft.

That is, it may be considered that the second planetary gear set PG2 forming the compound planetary gear set CG is configured to distribute the power provided from the second motor MG2 to the differential case and the selected output shaft, and the third planetary gear set PG3 is configured to reverse a direction of the power distributed to the selected output shaft to make directions of torques distributed to the differential case and the selected output shaft be opposite to each other according to the exemplary embodiment of FIG. 1.

A second planet carrier C2, which is the second rotation element of the second planetary gear set PG2, is connected to the second motor MG2 through a fourth clutch CL4, and a third planet carrier C3, which is the second rotation element of the third planetary gear set PG3, is fixed to the transmission housing CS.

Furthermore, a ratio of the number of teeth of a second sun gear S2 of the second planetary gear set PG2 and the number of teeth of a second ring gear R2 of the second planetary gear set PG2, and a ratio of the number of teeth of a third sun gear S3 of the third planetary gear set PG3 and the number of teeth of a third ring gear R3 of the third planetary gear set PG3 are set to be the same as each other.

According to the exemplary embodiment of the present invention, the second planetary gear set PG2 and the third planetary gear set PG3 are implemented by substantially the same planetary gear sets of which the numbers of teeth of the gears are the same as each other.

Note that a controller CLR in FIG. 1 may control the first motor MG1, the second motor MG2, the first clutch CL1, the second clutch CL2, the third clutch CL3, and the fourth clutch CL4 and may be implemented by a transmission control unit (TCU) or the like.

Figure 13:
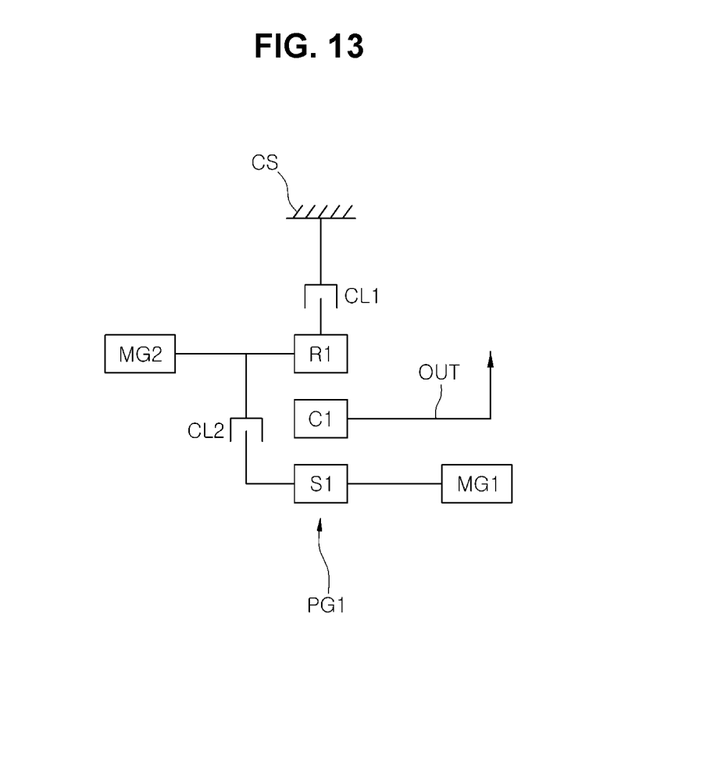
FIG. 13 is a schematic diagram of a transmission for an electric vehicle according to various exemplary embodiments of the present invention.

FIG. 13 illustrates a transmission for an electric vehicle according to various exemplary embodiments of the present invention. The transmission is a transmission for an electric vehicle including two or more motors, two or more clutches, and one or more planetary gear sets, and having two or more gears, and has a configuration in which a first motor MG1 is connected to a first rotation element of a first planetary gear set PG1, a third rotation element of the first planetary gear set PG1 is selectively connectable to a transmission housing CS by a first clutch CL1, a second rotation element of the first planetary gear set PG1 is connected to an output shaft OUT, a second motor MG2 is continuously connected to the third rotation element of the first planetary gear set PG1, a second clutch CL2 connecting any two elements of the first planetary gear set PG1 is provided, and transmission control through the second motor MG2 is possible.

Practically, it may be considered that the configuration according to the exemplary embodiment of FIG. 13 is different from the configuration according to the exemplary embodiment of FIG. 1 in that the compound planetary gear set CG is removed and the second motor MG2 is directly connected to the first planetary gear set PG1, and the first rotation element of the first planetary gear set is a first sun gear S1 and the second rotation element is a first planet carrier C1, and the third rotation element is a first ring gear R1.

Figure 14:
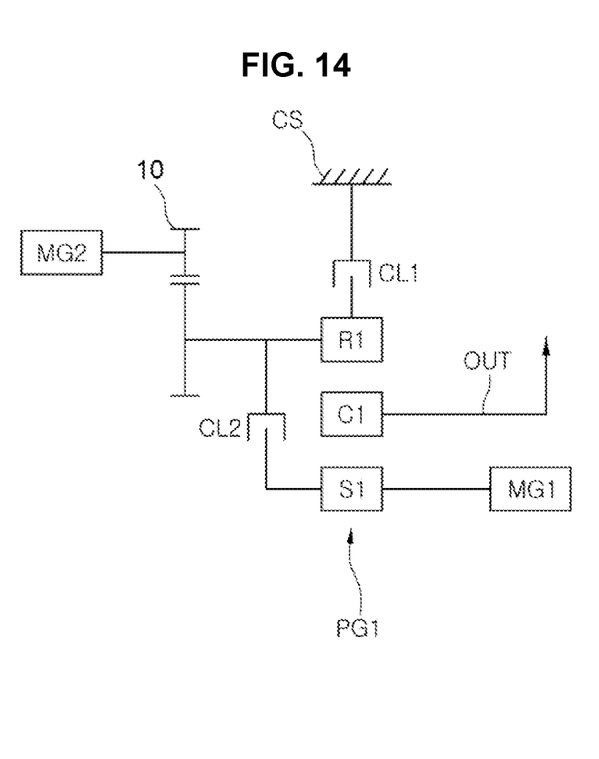
FIG. 14 is a schematic diagram of the transmission of FIG. 13 with a decelerator added according to an exemplary embodiment of the present invention.

FIG. 14 illustrates a transmission for an electric vehicle according to yet another exemplary embodiment of the present invention. Practically, a configuration according to the exemplary embodiment of FIG. 14 and the configuration according to the exemplary embodiment of FIG. 13 are substantially the same as each other. The configuration according to the exemplary embodiment of FIG. 14 is different from the configuration according to the exemplary embodiment of FIG. 13 only in that a second motor MG2 is continuously connected to a third rotation element of the first planetary gear set PG1 through a decelerator 10.

The exemplary embodiments of FIG. 13 and FIG. 14 are substantially the same as the exemplary embodiment of FIG. 1 except for the difference described above, and thus a detailed description thereof will be omitted.

A process in which a transmission control of the transmission for an electric vehicle configured as in FIG. 1 according to an exemplary embodiment of the present invention is performed will be described.

Referring to FIG. 3, FIG. 4, FIG. 5 and FIG. 6, a control method by which the transmission is shifted from a low gear (first gear) to a high gear (second gear) includes releasing, by the controller CLR, the first clutch CL1 after controlling the second motor MG2 to provide, to the third rotation element of the first planetary gear set, the same torque as a torque by which the first clutch CL1 supports the third rotation element of the first planetary gear set PG1, in a low gear driving state in which the first clutch CL1 is engaged and the first motor MG1 is driven (S10); maintaining, by the controller CLR, a torque of the first motor MG1 and a torque of the second motor MG2 constant while reducing a speed of the first motor MG1 and increasing a speed of the second motor MG2 to synchronize speeds of the three rotation elements of the first planetary gear set PG1 with one another (S20); and releasing, by the controller CLR, the torque of the second motor MG2 while maintaining the speed of the first motor MG1 after engaging the second clutch CL2 to form a high gear driving state (S30).

Hereinafter, such a process will be described in more detail.

In a first-speed state corresponding to the low gear, the output speed of the power provided from the first motor MG1 to the first sun gear S1 is reduced and the power is output to the differential DF through the first planet carrier C1 in the state in which the first clutch CL1 is engaged, and thus the first clutch CL1 fixes the first ring gear R1 of the first planetary gear set PG1.

Figure 4:
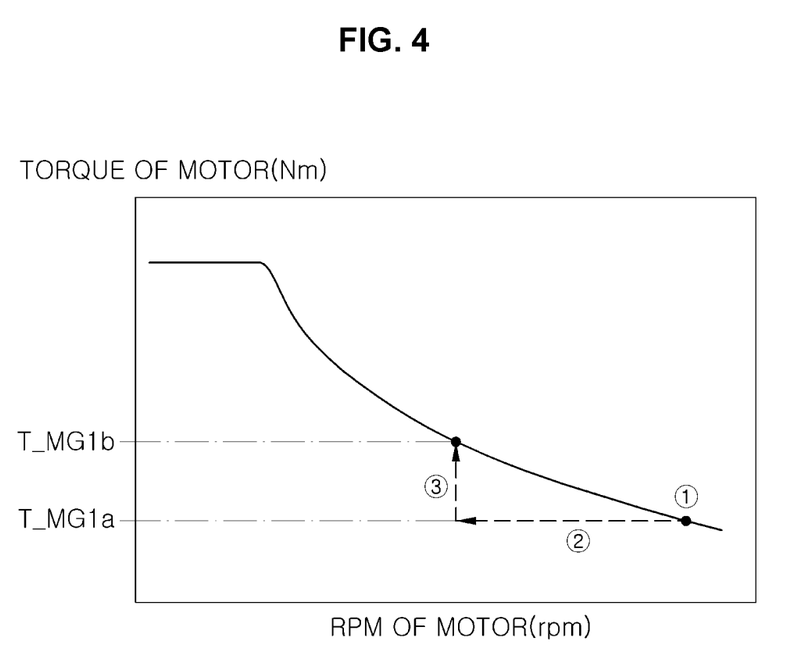
FIG. 4 is a motor characteristic graph illustrating a process in which the transmission of FIG. 1 is shifted from low to high gear.
Figure 5:
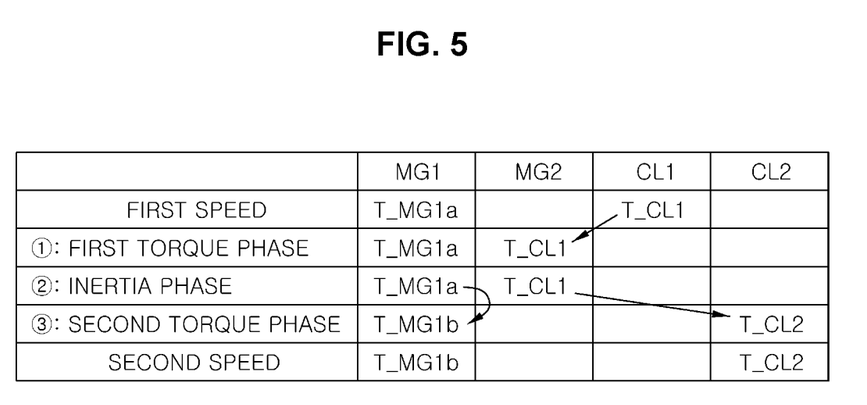
FIG. 5 is a table showing a process in which torques of motors and clutches are changed in the shifting process of FIG. 3.

At the present time, the first motor MG1 provides, to the first sun gear S1, a torque of T_MG1$a$ relatively smaller than T_MG1$b$ as illustrated in FIG. 4.

A torque to be applied to the first ring gear R1 to maintain the state in which the first ring gear R1 is fixed even when the first clutch CL1 is released for shifting to a second-speed state corresponding to the high gear is referred to as a "first clutch torque T_CL1". The second motor MG2 is controlled to generate the first clutch torque T_CL1 and then the first clutch CL1 is released, such that a first torque phase in which the torque of the second motor MG2 is changed but the speed of the first motor MG1 is not changed is started.

Accordingly, an inertia phase in which the torque of the first motor MG1 and the torque of the second motor MG2 are maintained, the speed of the first motor MG1 is reduced, and the speed of the second motor MG2 is increased to synchronize the rotation speeds of all the rotation elements of the first planetary gear set PG1 is started.

Accordingly, once the second clutch CL2 is engaged, since all of the rotation elements of the first planetary gear set PG1 are meshed with each other to rotate integrally, the power provided from the first motor MG1 is output to the differential DF at a shifting ratio of 1:1, and in the present state, a second torque phase in which the speed of the first motor MG1 and the torque of the second motor MG2 is released is started, completing the shifting to the second-speed state corresponding to the high gear.

In the second torque phase, the speed of the first motor MG1 is maintained and the torque of the second motor MG2 is released as described above, such that the torque of the first motor MG1 is increased.

The torque of the first motor MG1 may be increased to T_MG1$b$ in FIG. 4. It may be considered that the shifting process illustrated in FIG. 4 describes a process in which shifting between two points on an iso-power curve of the first motor MG1 as the transmission according to an exemplary embodiment of the present invention is shifted from a state in which T_MG1$a$ which is the maximum torque in the first-speed state is output to a state in which T_MG1$b$ which is the maximum torque in the second-speed state is output.

Note that a torque provided by the second clutch CL2 to maintain a state in which all of the rotation elements of the first planetary gear set PG1 are meshed with each other to rotate integrally is referred to as a second clutch torque T_CL2.

Figure 6:
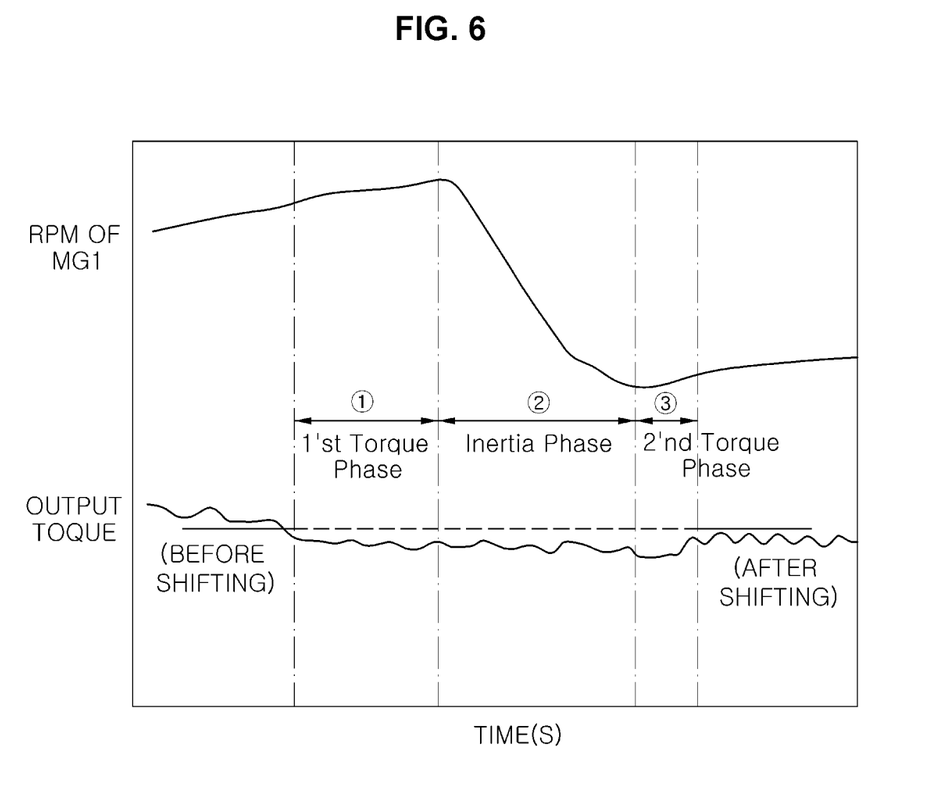
FIG. 6 is a graph for describing a process in which the transmission of FIG. 1 is shifted from low to high gear.
Figure 15:
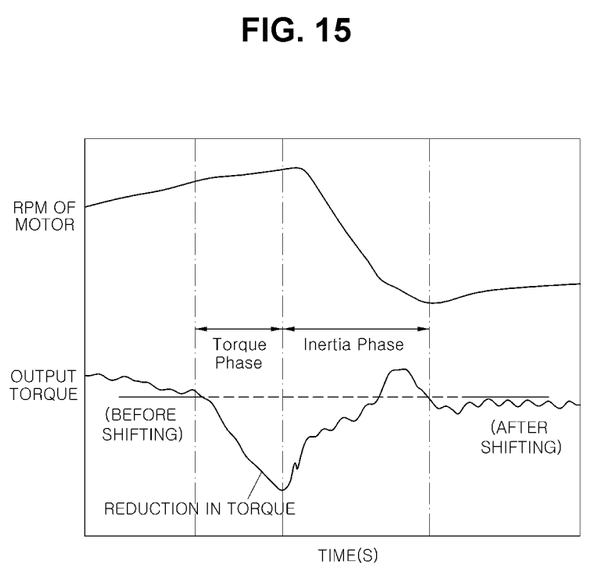
FIG. 15 is a graph for describing a process in which a general transmission for an electric vehicle according to the related art is shifted from low to high gear, which is provided for comparison with the graph of FIG. 6.

The shifting process described above may be expressed by a graph in FIG. 6. In the general transmission according to the related art, a torque output through the differential DF is reduced in a period corresponding to the first torque phase according to an exemplary embodiment of the present invention as illustrated in FIG. 15, such that shift quality deteriorates. However, in the transmission according to an exemplary embodiment of the present invention, an output torque is maintained without significant change before and after the shifting as illustrated in FIG. 6, such that it is possible to secure excellent shift quality without shift shock.

Furthermore, in the case of the transmission for an electric vehicle according to the related art, heat generation caused as the clutch takes a main role for shifting has been the biggest problem in developing the transmission. However, in an exemplary embodiment of the present invention, the second motor MG2 takes a main role for shifting, such that it is possible to prevent shift shock and heat generation in the clutch, and durability of the clutch and the transmission may also be largely improved.

Meanwhile, the third clutch CL3 is engaged before the torque is provided from the second motor MG2 to the third rotation element of the first planetary gear set in the first torque phase, and the third clutch CL3 is released after engaging the second clutch CL2 in the second torque phase.

That is, the third clutch CL3 may be engaged to provide the power of the second motor MG2 to the first planetary gear set PG1 to perform the action described above only at the time of shifting, and the third clutch CL3 may be released, and if needed, the fourth clutch may be engaged to control the second motor MG2 for the torque vectoring function.

The torque vectoring is a technology of actively controlling a driving torque output from the differential DF to opposite output shafts to effectively reduce understeer or the like at the time of high-speed curve driving of the vehicle or rough road driving in which friction coefficients of a right driving wheel and a left driving wheel with respect to the ground are different from each other, improving handling performance and stability of the vehicle. In the exemplary embodiment of FIG. 1, after engaging the fourth clutch CL4, the controller CLR may control the second motor MG2 to apply torques in opposite directions to the differential case and the selected output shaft, to thereby perform the torque vectoring.

Figure 7:
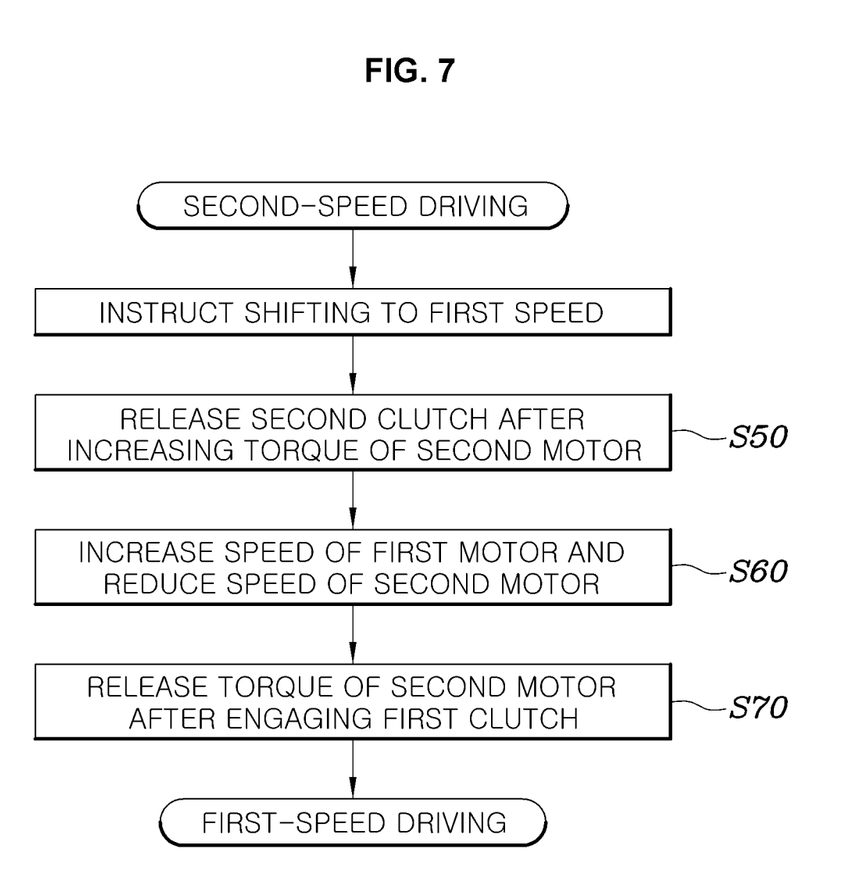
FIG. 7 is a flowchart illustrating a control method by which the transmission of FIG. 1 is shifted from high to low gear.
Figure 8:
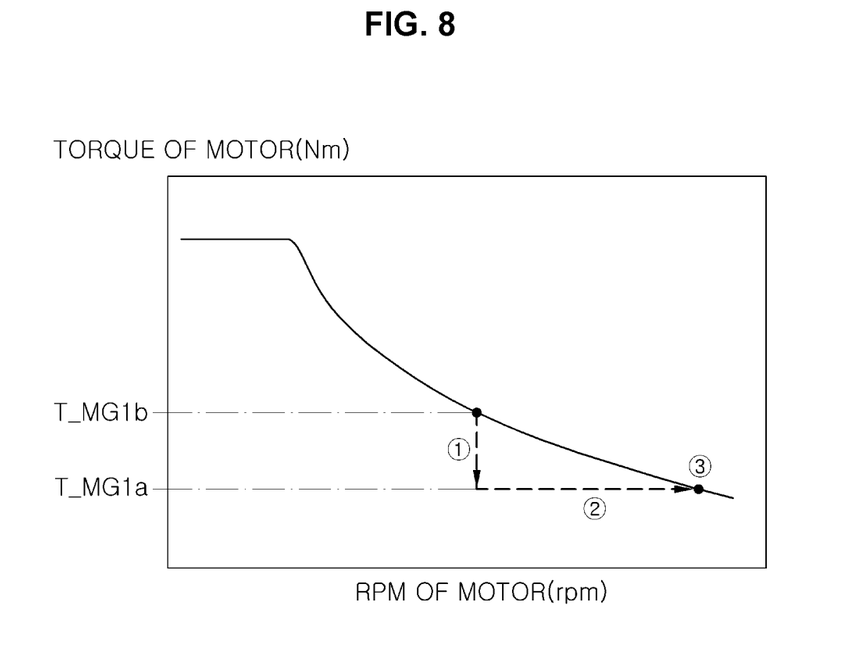
FIG. 8 is a motor characteristic graph illustrating a process in which the transmission of FIG. 1 is shifted from high to low gear.
Figure 9:
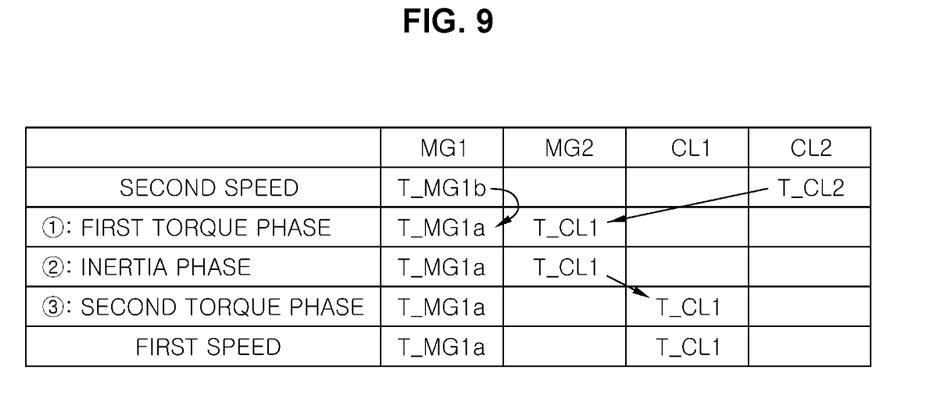
FIG. 9 is a table showing a process in which torques of motors and clutches are changed in the shifting process of FIG. 7.

Meanwhile, referring to FIGS. 7 to 9, a control method by which the transmission is shifted from a high gear (second gear) to a low gear (first gear) includes releasing, by the controller CLR, the second clutch CL2 after increasing the torque of the second motor MG2 to the first clutch torque while maintaining the speed of the first motor MG1, in the high gear driving state in which the second clutch CL2 is engaged and the first motor MG1 is driven (S50); maintaining, by the controller CLR, the torque of the first motor MG1 and the torque of the second motor MG2 constant while reducing the speed of the second motor MG2 to 0 and increasing the speed of the first motor MG1 (S60); and releasing, by the controller CLR, the torque of the second motor MG2 after engaging the first clutch CL1 to form the low gear driving state (S70).

Hereinafter, such a process will be described in more detail.

In the second-speed state corresponding to the high gear, the second clutch CL2 is engaged and all of the rotation elements of the first planetary gear set PG1 rotate at the same speed. The in the instant state, the controller CLR increases the torque of the second motor MG2 to the first clutch torque T_CL1 while maintaining the speed of the first motor MG1 for shifting to the first speed.

That is, the torque of the second motor MG2 is increased to make the second motor MG2 provide a torque corresponding to the first clutch torque T_CL1 which is a torque to be applied to the first ring gear R1 to implement the first-speed state by fixing the first ring gear R1.

The torque of the first motor MG1 is reduced as the torque of the second motor MG2 is increased, such that the speed of the first motor MG1 is maintained when the torque of the second motor MG2 is increased as described above.

Practically, the present process corresponds to the first torque phase in the transmission control, and is expressed as a reduction in torque of the first motor MG1 from T_MG1$b$ to T_MG1$a$ in FIG. 8.

Once the torque of the second motor MG2 is increased to the first clutch torque, the second clutch CL2 is released.

Accordingly, an inertia phase in which the torque of the first motor MG1 and the torque of the second motor MG2 are maintained constant, the speed of the second motor MG2 is reduced to 0, and the speed of the first motor MG1 is increased is started.

Once the speed of the second motor MG2 becomes 0, the first clutch CL1 is engaged to fix the first ring gear R1, and then the torque of the second motor MG2 is released to start a second torque phase, completing the shifting from the high gear to the low gear.

The output torque is maintained substantially constant even in the above-described shifting process, such that the shift shock does not occur and excellent shift quality may be secured, ultimately contributing to improvement of marketability of the vehicle. Furthermore, since the heat generation in the clutch involved in the shifting does not occur, improvement in durability of the clutch and the transmission is also expected.

Even in the instant case, the third clutch CL3 is engaged before the torque is provided from the second motor MG2 to the first ring gear R1 in the first torque phase, and the third clutch CL3 is released after releasing the torque of the second motor MG2 in the second torque phase.

As described above, the transmission for an electric vehicle according to an exemplary embodiment of the present invention provides two shifting ratios (the low gear and the high gear) to achieve the maximum hill-climbing ability requiring a relatively high torque and the maximum speed performance requiring a relatively high-speed power while improving energy efficiency by reducing a weight of the vehicle, even in the case of using the first motor MG1 with a relatively small capacity.

Furthermore, in the case where the first clutch CL1 and the second clutch CL2 are engaged and released after the first clutch torque T_CL1 or the second clutch T_CL2 is generated by the second motor MG2, theoretically, a state in which friction and heat generation rarely occurs may be implemented. Therefore, it is possible to prevent the heat generation in the transmission and the clutch and improve durability.

Figure 10:
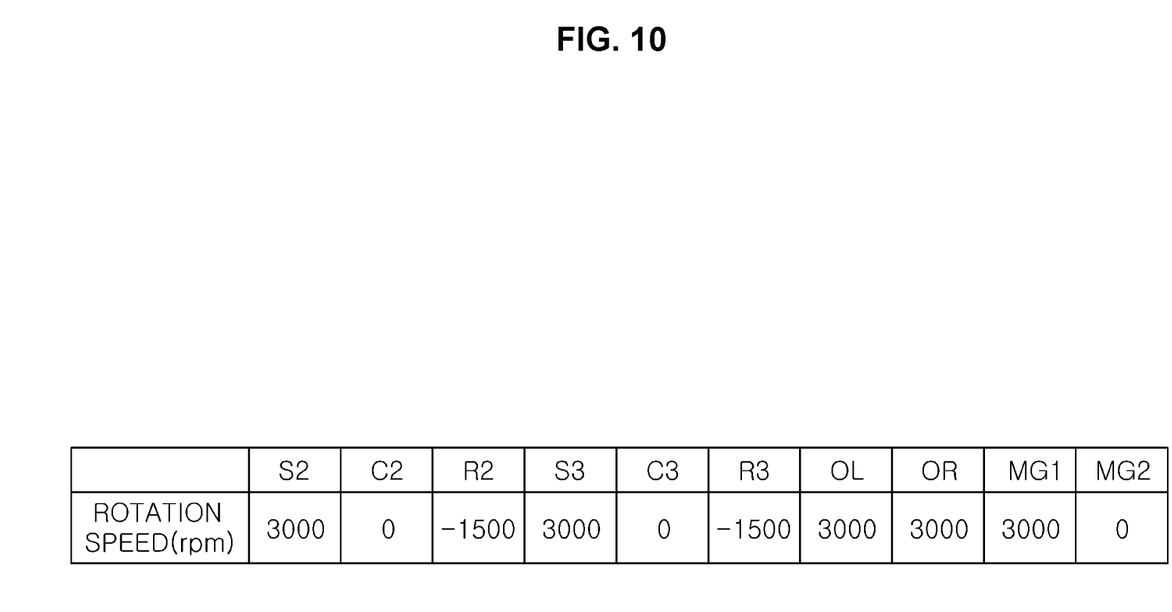
FIG. 10 is a table showing a rotation speed of each portion in a state in which a fourth clutch is engaged and a second motor is stopped in the transmission of FIG. 1.
Figure 11:
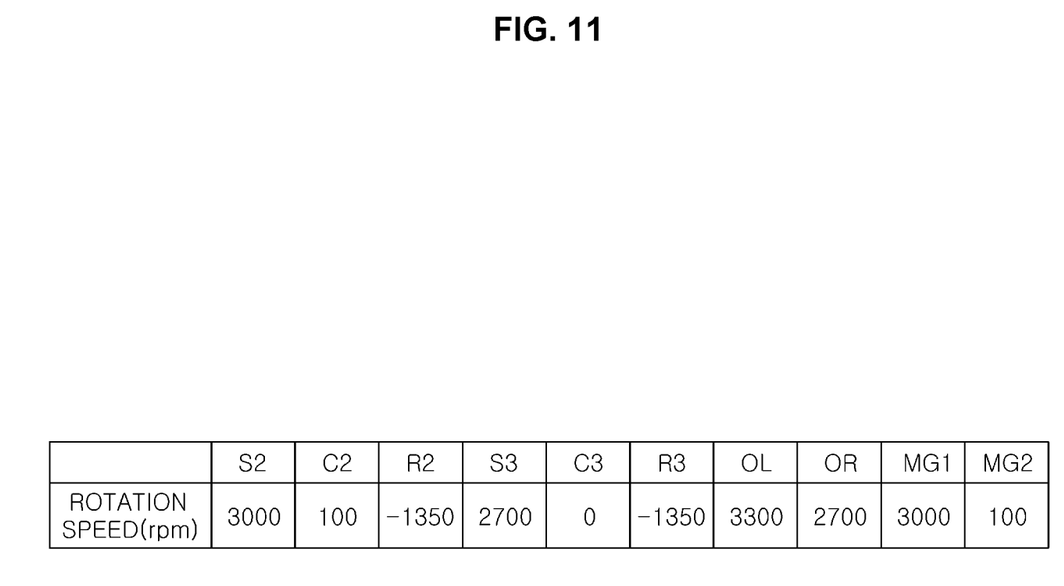
FIG. 11 is a table showing a rotation speed of each portion in a state where the fourth clutch is engaged and the second motor is driven at a speed of 100 RPM in the transmission of FIG. 1.
Figure 12:
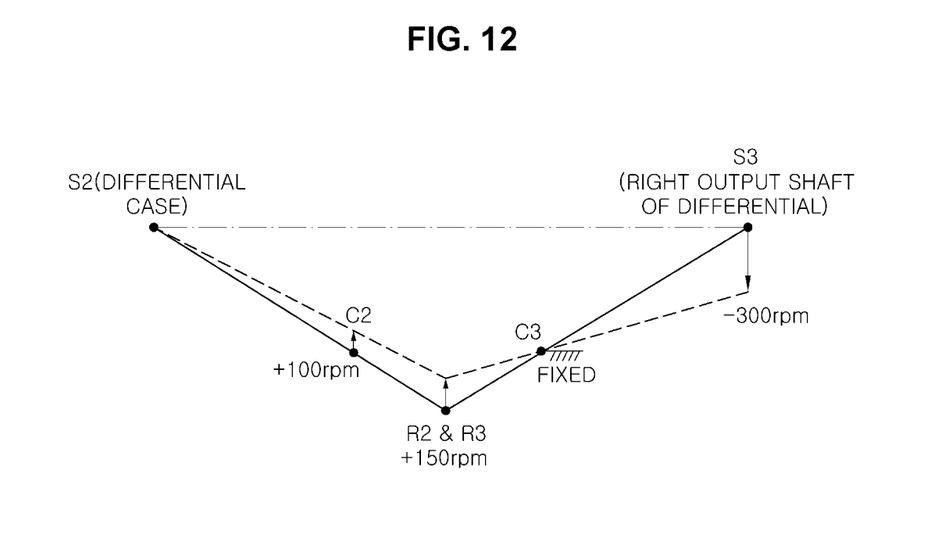
FIG. 12 is a diagram for describing a torque vectoring function by comparing the state of FIG. 10 and the state of FIG. 11 with each other by use of lever diagrams of a second planetary gear set and a third planetary gear set.

Meanwhile, FIG. 10, FIG. 11, and FIG. 12 are drawings for describing implementation of the torque vectoring function by the transmission of FIG. 1. FIG. 10 is a table showing a rotation speed of each portion in a state in which the fourth clutch CL4 is engaged and the second motor MG2 is stopped in the transmission of FIG. 1.

That is, in the case where the second motor MG2 is not driven and thus a speed thereof is 0, both of a speed of the left output shaft OL and a speed of the right output shaft OR of the differential DF are equally 3000.

Note that the rotation speed of each portion is determined under the assumption that the number of teeth of the second ring gear R2 is 60, the number of teeth of the second sun gear S2 is 30, the number of teeth of the third ring gear R3 is 60, and the number of teeth of the third sun gear S3 is 30.

FIG. 11 is a table showing a rotation speed of each portion in the case where the fourth clutch CL4 is engaged and the second motor MG2 is driven at a speed of 100 RPM in the transmission of FIG. 1.

That is, in the case where the second motor MG2 is driven at 100 RPM, the speed of the left output shaft OL of the differential DF becomes 3300, and the speed of the right output shaft OR becomes 2700. As a result, each of a speed deviation to the right side from the differential case of the differential DF and a speed deviation to the left side from the differential case of the differential DF becomes 300 RPM, implementing the torque vectoring.

FIG. 12 is a diagram for describing the torque vectoring function by comparing the state of FIG. 10 and the state of FIG. 11 with each other by use of lever diagrams of the second planetary gear set and the third planetary gear set. In FIG. 12, a solid line indicating the state of FIG. 10 and a dotted line indicating the state of FIG. 11 shows that the torque vectoring is performed.

Note that FIG. 12 illustrates the case where a speed of the third sun gear S3 connected to the right output shaft OR of the differential DF is reduced by 300 RPM according to a speed of the second sun gear S2 connected to the differential case, and thus, although not illustrated, the left output shaft of the differential DF is increased by 300 RPM based on the speed of the differential case depending on a configuration and an action of the differential DF.

As described above, in the transmission according to an exemplary embodiment of the present invention, the second motor MG2 is involved in the shifting in a state in which the third clutch CL3 is engaged to implement smooth shifting, and the torque vectoring function is implemented in a state in which the fourth clutch CL4 is engaged, making it possible to improve driving stability at the time of high-speed curve driving of the vehicle.

Meanwhile, the shifting control of the transmissions of FIG. 13 and FIG. 14 according to the exemplary embodiments are substantially the same as the shifting control of the transmission of FIG. 1 except for the torque vectoring, and thus a detailed description thereof will be omitted.

According to an exemplary embodiment of the present invention, it is possible to provide a plurality of gear ratios to reduce a capacity of a motor, achieve a maximum hill-climbing ability and maximum speed performance required by a vehicle, improve energy efficiency of the vehicle with a relatively simple configuration and a small weight, increase a driving distance per charge, prevent shift shock, significantly reduce heat generation, and implement a torque vectoring are configured to improve high-speed curve driving performance of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A transmission for a vehicle, the transmission comprising:
    a first planetary gear set including three rotation elements of a first rotation element, a second rotation element, and a third rotation element;
    a first motor connected to the first rotation element of the first planetary gear set and configured to input power to the first rotation element of the first planetary gear set;
    a differential connected to the second rotation element of the first planetary gear set and configured to receive power output from the second rotation element of the first planetary gear set;
    a second motor configured to selectively provide power to the third rotation element of the first planetary gear set;
    a second planetary gear set including a first rotation element which is connected to a differential case of the differential, and a second rotation element which is configured to selectively receive power from the second motor; and
    a third planetary gear set including a third rotation element which is connected to a third rotation element of the second planetary gear set, a second rotation element which is fixed to be stationary, and a first rotation element which is connected to a selected output shaft, the selected output shaft being one of output shafts of the differential.

2. The transmission for the vehicle of claim 1, further including:
    a first clutch configured to selectively connect the third rotation element of the first planetary gear set to a transmission housing; and
    a second clutch configured to selectively connect two of the three rotation elements of the first planetary gear set to each other directly.

3. The transmission for the vehicle of claim 2,
    wherein the first planetary gear set includes a first sun gear as the first rotation element of the first planetary gear set, a first planet carrier as the second rotation element of the first planetary gear, and a first ring gear as the third rotation element of the first planetary gear and selectively connectable to the first clutch, and
    wherein the second clutch is configured to selectively connect the first sun gear and the first ring gear to each other.

4. The transmission for the vehicle of claim 3, wherein the second motor is selectively connectable to the first ring gear of the first planetary gear set through a third clutch.

5. The transmission for the vehicle of claim 3, wherein a ratio of a number of teeth of a second sun gear of the second planetary gear set and a number of teeth of a second ring gear of the second planetary gear set, and a ratio of a number of teeth of a third sun gear of the third planetary gear set and a number of teeth of a third ring gear of the third planetary gear set are a same as each other.

6. The transmission for the vehicle of claim 4, wherein the second rotation element of the second planetary gear set is selectively connectable to the second motor through a fourth clutch.

7. A control method of the transmission for the vehicle of claim 6, the control method comprising:
    releasing, by a controller, the first clutch after controlling the second motor to provide, to the third rotation element of the first planetary gear set, a same torque as a torque by which the first clutch supports the third rotation element of the first planetary gear set, in a first gear driving state in which the first clutch is engaged and the first motor is driven;

maintaining, by the controller, a torque of the first motor and a torque of the second motor constant while reducing a speed of the first motor and increasing a speed of the second motor to synchronize speeds of the three rotation elements of the first planetary gear set with one another; and releasing, by the controller, the torque of the second motor while maintaining the speed of the first motor after engaging the second clutch to form a second gear driving state.

8. The control method of claim 7, wherein the controller is configured to engage the third clutch before the torque is provided from the second motor to the third rotation element of the first planetary gear set, and releases the third clutch after engaging the second clutch.

9. The control method of claim 7, wherein after engaging the fourth clutch, the controller is configured to control the second motor to apply torques in opposite directions to the differential case and the selected output shaft, to perform torque vectoring.

10. The control method of claim 7, further including:
releasing, by the controller, the second clutch after increasing the torque of the second motor to a first clutch torque while maintaining the speed of the first motor, in the second gear driving state in which the second clutch is engaged and the first motor is driven;
maintaining, by the controller, the torque of the first motor and the torque of the second motor constant while reducing the speed of the second motor to 0 and increasing the speed of the first motor; and
releasing, by the controller, the torque of the second motor after engaging the first clutch to form the first gear driving state.

11. The control method of claim 10, wherein the controller is configured to engage the third clutch before releasing the second clutch and increasing the torque of the second motor, and releases the third clutch after releasing the torque of the second motor.

12. The control method of claim 10, wherein after engaging the fourth clutch, the controller is configured to control the second motor to apply torques in opposite directions to the differential case and the selected output shaft, to perform torque vectoring.

13. A transmission for a vehicle, the transmission comprising:
a first planetary gear set including three rotation elements of a first rotation element, a second rotation element, and a third rotation element;
a first motor connected to the first rotation element of the first planetary gear set and configured to input power to the first rotation element of the first planetary gear set;
a differential connected to the second rotation element of the first planetary gear set and configured to receive power output from the second rotation element of the first planetary gear set;
a second motor configured to selectively provide power to the third rotation element of the first planetary gear set; and
a compound planetary gear set mounted between a differential case of the differential and a selected output shaft to distribute power provided from the second motor to the differential case and the selected output shaft, and to make directions of torques distributed to the differential case and the selected output shaft be opposite to each other, the selected output shaft being one of output shafts of the differential, wherein the compound planetary gear set includes:
a second planetary gear set including a first rotation element which is connected to the differential case, and a second rotation element which is configured to be selectively connectable to the second motor; and
a third planetary gear set including a third rotation element which is connected to a third rotation element of the second planetary gear set, a second rotation element which is fixed to be stationary, and a first rotation element which is connected to the selected output shaft.

14. A control method of a transmission for a vehicle comprising two or more motors, two or more clutches, and one or more planetary gear sets, and having two or more gears, wherein a first motor of the two or more motors is connected to a first rotation element of a first planetary gear set of the one or more planetary gear sets, wherein the first planetary gear set includes three rotation elements of the first rotation element, a second rotation element and a third rotation element, wherein the third rotation element of the first planetary gear set is selectively connectable to a transmission housing by a first clutch, wherein the second rotation element of the first planetary gear set is connected to an output shaft, wherein a second motor of the two or more motors is connected to the third rotation element of the first planetary gear set, wherein a second clutch selectively connecting two rotation elements among the three rotation elements of the first planetary gear set is provided, and wherein transmission control through the second motor is allowed, the control method including:
releasing, by a controller, the first clutch after controlling the second motor to provide, to the third rotation element of the first planetary gear set, a same torque as a torque by which the first clutch supports the third rotation element of the first planetary gear set, in a first gear driving state in which the first clutch is engaged and the first motor is driven;
maintaining, by the controller, a torque of the first motor and a torque of the second motor constant while reducing a speed of the first motor and increasing a speed of the second motor to synchronize speeds of the three rotation elements of the first planetary gear set with one another; and
releasing, by the controller, the torque of the second motor while maintaining the speed of the first motor after engaging the second clutch to form a second gear driving state.

15. The control method of claim 14, further including:
releasing, by the controller, the second clutch after increasing the torque of the second motor to a first clutch torque while maintaining the speed of the first motor, in the second gear driving state in which the second clutch is engaged and the first motor is driven;
maintaining, by the controller, the torque of the first motor and the torque of the second motor constant while reducing the speed of the second motor to 0 and increasing the speed of the first motor; and
releasing, by the controller, the torque of the second motor after engaging the first clutch to form the first gear driving state.

* * * * *